United States Patent [19]

Nukada et al.

[11] Patent Number: 5,463,044
[45] Date of Patent: Oct. 31, 1995

[54] PROCESS FOR PREPARING CHLOROGALLIUM PHTHALOCYANINE CRYSTAL

[75] Inventors: Katsumi Nukada; Akira Imai; Masakazu Iijima, all of Minami Ashigara,, Japan

[73] Assignee: Fuji Xerox Co., Ltd., Tokyo, Japan

[21] Appl. No.: 107,977

[22] Filed: Aug. 18, 1993

[30] Foreign Application Priority Data

Aug. 26, 1992 [JP] Japan .................... 4-248933

[51] Int. Cl.$^6$ .................. C09B 67/50; C09B 47/067; C09B 47/073
[52] U.S. Cl. .................. 540/143; 540/122; 540/139; 540/140; 540/141
[58] Field of Search ................ 540/143, 141, 540/142, 139, 140

[56] References Cited

U.S. PATENT DOCUMENTS

| | | | |
|---|---|---|---|
| 2,770,629 | 11/1956 | Eastes | 260/314.5 |
| 3,160,635 | 12/1964 | Knudsen et al. | 260/314.5 |
| 3,357,989 | 12/1967 | Byrne et al. | 260/314.5 |
| 3,708,292 | 1/1973 | Brach et al. | 96/1.5 |
| 5,059,355 | 10/1991 | Ono et al. | 540/141 |
| 5,106,536 | 4/1992 | Miyamoto et al. | 540/140 |
| 5,164,493 | 11/1992 | Mayo et al. | 540/143 |
| 5,189,155 | 2/1993 | Mayo et al. | 540/143 |
| 5,189,156 | 2/1993 | Mayo et al. | 540/141 |
| 5,358,813 | 10/1991 | Iijima et al. | 540/141 |

FOREIGN PATENT DOCUMENTS

| | | |
|---|---|---|
| 50-38543 | 4/1975 | Japan . |
| 1-221459 | 12/1989 | Japan . |
| 3-30854 | 5/1991 | Japan . |
| 2255569 | 11/1992 | United Kingdom . |

OTHER PUBLICATIONS

Linsky et al: Inorg, Chem; vol 19, No 10, 1980 p. 3132 Supplied by the applicant.
John P. Linsky, Thomas R. Paul, Ronald S. Nohr and Malcolm E. Kenney; *Inorg. Chem.*; vol. 19; 1980; pp. 3131–3135.

*Primary Examiner*—Mukund J. Shah
*Assistant Examiner*—Pavanaram K. Sripada
*Attorney, Agent, or Firm*—Oliff & Berridge

[57] ABSTRACT

A process for preparing chlorogallium phthalocyanine comprising the steps of: reacting gallium trichloride and phthalonitrile or diiminoisoindoline in an aromatic hydrocarbon solvent; and treating the resulting chlorogallium phthalocyanine with a second solvent different from the aromatic hydrocarbon solvent.

18 Claims, 9 Drawing Sheets

PROCESS FOR PREPARING CHLOROGALLIUM PHTHALOCYANINE CRYSTAL

FIELD OF THE INVENTION

This invention relates to a process for preparing chlorogallium phthalocyanine crystals.

BACKGROUND OF THE INVENTION

Phthalocyanine compounds are useful as coatings, printing inks, catalysts or electronic materials. In recent years, they have been extensively studied particularly for their use as electrophotographic photoreceptor materials, optical recording materials and photoelectric conversion materials.

It is known that phthalocyanine compounds generally exhibit several different crystal forms depending on the process of synthesis and the process of treatment and that the difference in crystal form has a great influence on their photoelectric conversion characteristics. For example, known crystal forms of copper phthalocyanine compounds include $\alpha$-, $\pi$-, $\chi$-, $\rho$-, $\gamma$-, and $\delta$-forms as well as a stable $\beta$-form. These crystal forms are capable of interconversion by a mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, JP-A-50-38543 (the term "JP-A" as used herein means an "unexamined published Japanese patent application") refers to the relationship between a crystal form of copper phthalocyanine and its electrophotographic characteristics. Besides copper phthalocyanine, it has been proposed to use various crystal forms of metal-free phthalocyanine, hydroxygallium phthalocyanine, chloroaluminum phthalocyanine, chloroindium phthalocyanine, etc. in electrophotographic photoreceptors.

In the course of study on the relationship between crystal forms of various phthalocyanine compounds and their electrophotographic characteristics, the present inventors previously discovered three novel crystal forms of chlorogallium phthalocyanine and revealed their excellent characteristics as a photoreceptor (as described in JP-A-5-98181).

Various processes for synthesizing chlorogallium phthalocyanine have hitherto been proposed. Known processes include, for example, (i) reaction between gallium trichloride and diiminoisoindoline (*D.C.R. Acad. Sci.*, Vol. 242, p. 1026 (1956)), (ii) reaction between gallium trichloride and phthalonitrile (JP-B-3-30854; the term "JP-B" as used herein means an "examined published Japanese patent application"), (iii) reaction between gallium trichloride and phthalonitrile in butyl cellosolve in the presence of a catalyst (JP-A-1-221459); and (iv) reaction between gallium trichloride and phthalonitrile in quinoline (*Inorg. Chem.*, Vol. 19, p. 3131 (1980)).

Where chlorogallium phthalocyanine is synthesized under a solvent-free condition as in processes (i) and (ii) above, there is a problem that the phthalocyanine ring undergoes chlorination, resulting in production of a mixture composed of gallium phthalocyanine compounds having different degrees of chlorine substitution, making it difficult to obtain a desired crystal form. Where synthesis is conducted by using a solvent, e.g., butyl cellosolve or quinoline, as in processes (iii) and (iv) above, the problem is that the solvent exerts a great influence on the electrophotographic characteristics of the resulting chlorogallium phthalocyanine, making it difficult to obtain a crystal form with desired electrophotographic characteristics.

The process proposed by the present inventors which comprises reacting gallium trichloride and diiminoisoindoline in quinoline (JP-A-5-98181) affords chlorogallium phthalocyanine having excellent electrophotographic characteristics in high yield. The chlorogallium phthalocyanine synthesized by this process has a stable crystal form showing an intense peak at a Bragg angle ($2\theta \pm 0.2°$) at 27.0°, which must be transformed to a crystal form suitable as an electrophotographic photoreceptor. When the crystal transformation is carried out by acid pasting which is one of widespread means for preparing phthalocyanine pigments, chlorogallium phthalocyanine undergoes hydrolysis. Therefore, the crystal transformation for obtaining a desired crystal form should be performed by first pulverizing by mechanical dry grinding to once decrease the crystallinity and then treating the fine powder with a solvent. However, not only does this process of crystal transformation attain very low efficiency but tend to cause pigment particles agglomerate to form bulky particles only to provide non-uniform crystals which hardly show stable characteristics.

Thus, the conventional processes of synthesis or treatment of chlorogallium phthalocyanine have encountered difficulty in obtaining a desired crystal form, or involved complicated operation for crystal transformation, or found difficulty in controlling a crystal form.

SUMMARY OF THE INVENTION

An object of the present invention is to provide a process for preparing a chlorogallium phthalocyanine crystal which can easily be converted to a crystal form exhibiting excellent electrophotographic characteristics.

Another object of the present invention is to provide a process for preparing a chlorogallium phthalocyanine crystal excellent in electrophotographic characteristics.

Other objects and effects of the present invention will be apparent from the following description.

As a result of extensive investigations, the present inventors have found that chlorogallium phthalocyanine whose crystal which can easily be converted to one suitable as an electrophotographic photoreceptor can be obtained by subjecting chlorogallium phthalocyanine synthesized by a reaction in an aromatic hydrocarbon solvent to a solvent treatment with a solvent different from that used in the reaction, and thus reached the present invention.

The present invention relates to a process for preparing chlorogallium phthalocyanine comprising the steps of:

reacting gallium trichloride and phthalonitrile or diiminoisoindoline in an aromatic hydrocarbon solvent; and treating the resulting chlorogallium phthalocyanine with a second solvent different from the aromatic hydrocarbon solvent.

In the above process, the resulting chlorogallium phthalocyanine is preferably a chlorogallium phthalocyanine crystal.

The present invention also relates to a process for preparing a chlorogallium phthalocyanine crystal showing distinct diffraction peaks at Bragg angles ($2\theta \pm 0.2°$) of 7.4°, 16.6°, 25.5°, and 28.3° in an X-ray diffraction spectrum, the process comprising the steps of:

reacting gallium trichloride and phthalonitrile or diiminoisoindoline in an aromatic hydrocarbon solvent;

treating the resulting chlorogallium phthalocyanine with a second solvent different from the aromatic hydrocarbon solvent, to obtain a chlorogallium phthalocyanine crystal showing a distinct diffraction peak at a Bragg angle (28±0.2°) of 7.4° in an X-ray diffraction spectrum;

dry grinding the chlorogallium phthalocyanine crystal showing a distinct diffraction peak at a Bragg angle (28±0.2°) of 7.4°; and treating the ground crystal with an aromatic alcohol to convert the crystal form thereof.

The present invention further relates to a process for preparing chlorogallium phthalocyanine comprising the step of reacting gallium trichloride and phthalonitrile or diiminoisoindoline an aromatic hydrocarbon solvent.

DETAILED DESCRIPTION OF THE INVENTION

Figure 1:
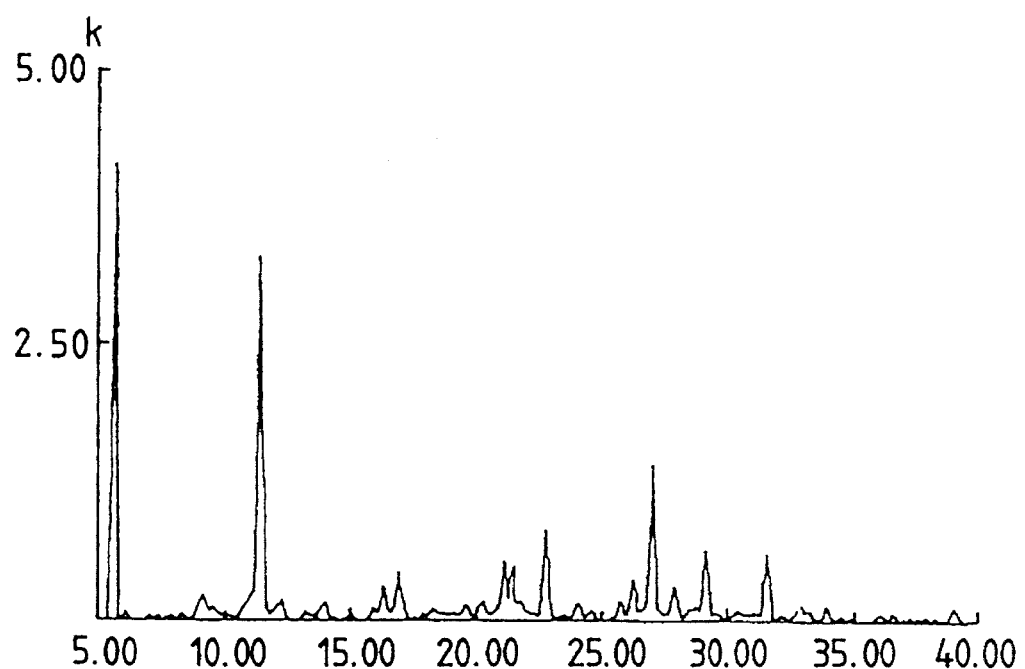
FIG. 1 is an X-ray diffraction pattern of the chlorogallium phthalocyanine as synthesized by the reaction in Example 1.

In the reaction between gallium trichloride and phthalonitrile or diiminoisoindoline, phthalonitrile or diiminoisoindoline is preferably used in an amount at least 4 times by weight, usually from 4 to 10 times by weight, the weight of gallium trichloride.

From the standpoint of the production rate of chlorogallium phthalocyanine, the aromatic hydrocarbon solvent which can be used in the reaction is preferably selected from halogenated aromatic hydrocarbons having a boiling point of not lower than 150° C., such as α- or β-chloronaphthalene, o- or p-dichlorobenzene, trichlorobenzene, etc. The halogenated hydrocarbon solvent is generally used in an amount 0.2 to 20 times by weight the weight of phthalonitrile or diiminoisoindoline. Too small an amount of the solvent makes stirring difficult while too large an amount not only needs much time for the treatment but is uneconomical. The solvent is preferably used in an amount of from 0.3 to 10 times by weight the weight of phthalonitrile or diiminoisoindoline.

The reaction is generally carried out by heating at a temperature ranging from 100° C. up to the boiling point of the solvent in an inert atmosphere.

The thus synthesized chlorogallium phthalocyanine is then subjected to a treatment with a solvent which is different from that used in the above-mentioned reaction. The solvent treatment can be carried out by dispersing the reaction product as separated by filtration in a solvent followed by stirring either at ambient temperature or under heating. The solvent treatment may be effected by simply washing the wet filter cake of the reaction product with a solvent. By this solvent treatment, the crystal form can be transformed. For example, a treatment with dimethylformamide gives a chlorogallium phthalocyanine crystal exhibiting a distinct diffraction peak at a Bragg angle (28±0.2°) of 7.4° in an X-ray diffraction spectrum.

Examples of the solvents which can be used in the solvent treatment include aromatic hydrocarbon solvents, e.g., toluene and chlorobenzene; amide solvents, e.g., dimethylformamide (DMF) and N-methylpyrrolidone; aliphatic alcohol solvents, e.g., methanol, ethanol, and n-butanol; aliphatic polyhydric alcohol solvents, e.g., glycerin and polyethylene glycol; ketone solvents, e.g., cyclohexanone and methyl ethyl ketone; aliphatic halogenated hydrocarbon solvents, e.g., methylene chloride; ether solvents, e.g., tetrahydrofuran; benzyl alcohol; water; and mixtures of two or more thereof.

If desired, the solvent treatment can be performed while milling with the aid of a grinding medium, such as glass beads, steel beads, and alumina beads. The treating temperature is generally from 0° C. up to the boiling point of the solvent, and preferably from 10° to 60° C.

The thus obtained chlorogallium phthalocyanine crystals can have its crystal form transformed by dry grinding followed by a solvent treatment. In particular, dry grinding of a chlorogallium phthalocyanine crystal having a distinct X-ray diffraction peak at a Bragg angle (28±0.2°) of 7.4° in an X-ray diffraction spectrum easily gives a crystal with reduced crystallinity. When the resulting low crystalline crystal is then treated with an aromatic alcohol, e.g., benzyl alcohol, crystal transformation easily takes place to give a chlorogallium phthalocyanine crystal having distinct peaks at Bragg angles (28±0.2°) of 7.4°, 16.6°, 25.5°, and 28.3° in an X-ray diffraction spectrum.

The resulting chlorogallium phthalocyanine crystal may further be subjected to dry grinding and solvent treatment for crystal transformation.

The dry grinding can be carried out by means of a ball mill, an attritor, a roll mill, a sand mill, a homomixer, and so forth. If desired, a grinding aid, such as sodium chloride or salt cake, may be used to thereby achieve efficient crystal transformation to obtain a desired crystal form with regular grain size. The grinding aid is generally used in an amount of from 0.5 to 20 times by weight, and preferably from 1 to 10 times by weight, the amount of the crystal.

The resulting chlorogallium phthalocyanine crystals can be used as a photoconductive material to provide an electrophotographic photoreceptor having small dark decay and high photosensitivity.

The present invention is now illustrated in greater detail with reference to Examples, Crystal Transformation Examples, and Application Examples but it should be understood that the present invention is not deemed to be limited thereto. All the parts and percents are by weight unless otherwise indicated.

EXAMPLES 1 TO 10

In 500 ml of α-chloronaphthalene were reacted 100 parts of gallium trichloride and 291 parts of phthalonitrile under a nitrogen stream at 200° C. for 4 hours. The resulting chlorogallium phthalocyanine was collected by filtration. An aliquot of the wet cake was washed with α-chloronaphthalene, dried, and subjected to powder X-ray diffractiometry. The powder X-ray diffraction pattern obtained is shown in FIG. 1. The chlorogallium phthalocyanine showed distinct diffraction peaks at Bragg angles (2θ±0.2°) of 5.6, 11.2, 22.7, 27.0, 29.2, and 31.6 in the X-ray diffraction spectrum shown in FIG. 1.

The wet cake was divided into 10 equal portions. Each portion was dispersed in 100 ml of the solvent shown in Table 1 below and stirred at 150° C. for 30 minutes. The powder X-ray diffraction pattern of the resulting chlorogallium phthalocyanine crystal is shown in Table 1. In Example 1 using dimethylformamide (DMF) as a solvent, the wet cake as filtered was thoroughly washed with methanol and dried to obtain 17.5 parts of a chlorogallium phthalocyanine crystal.

TABLE 1

Figure 2:
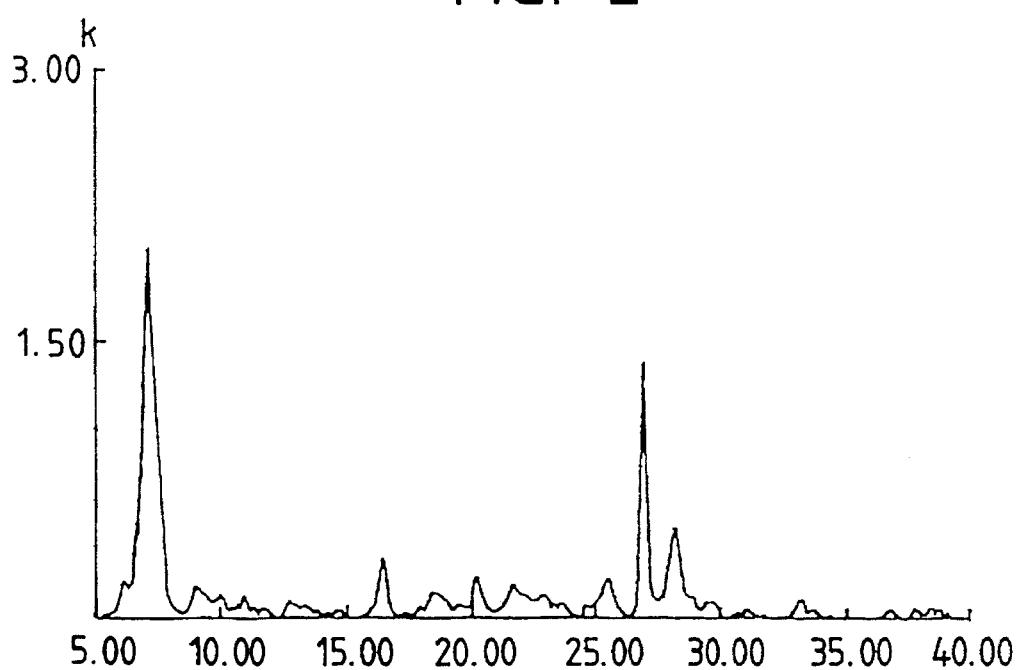
FIGS. 2 through 11 is each an X-ray diffraction pattern of the chlorogallium phthalocyanine crystals obtained in Examples 1 to 13, respectively.
Figure 3:
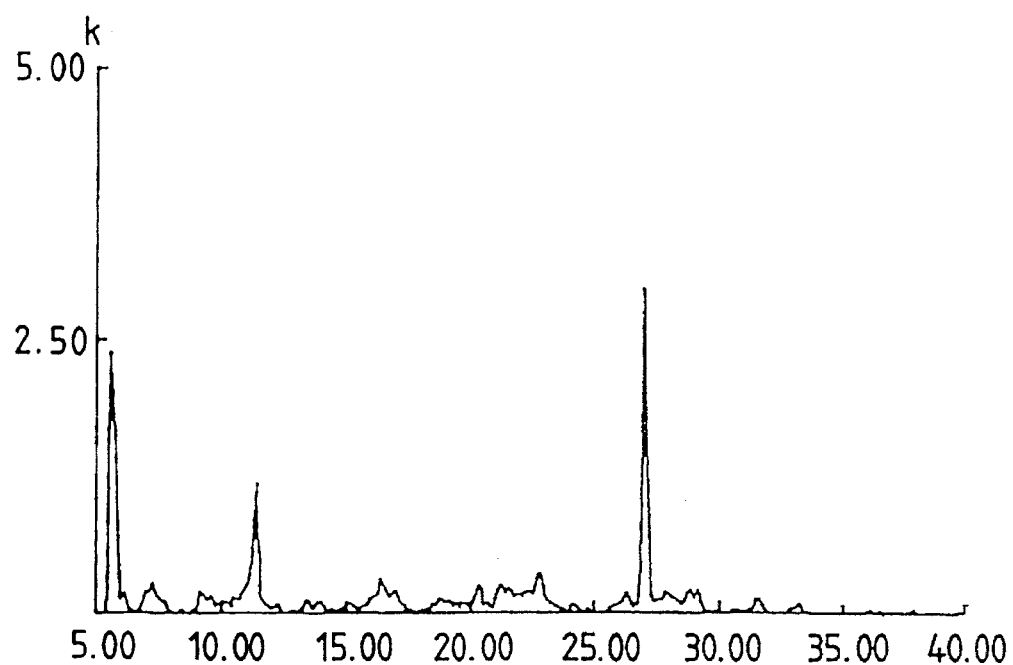
Figure 4:
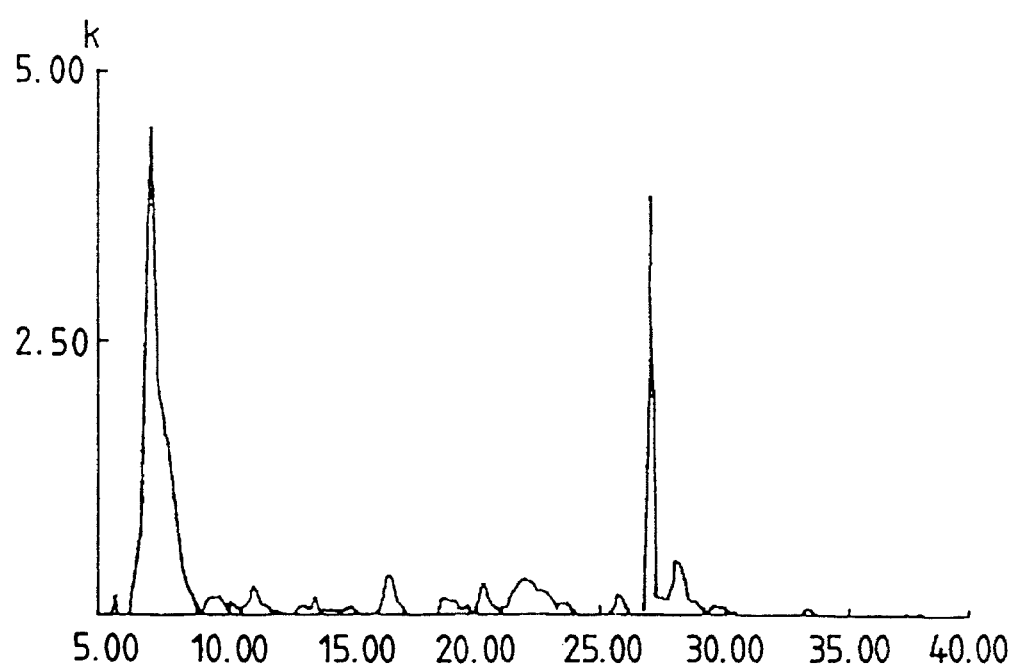
Figure 5:
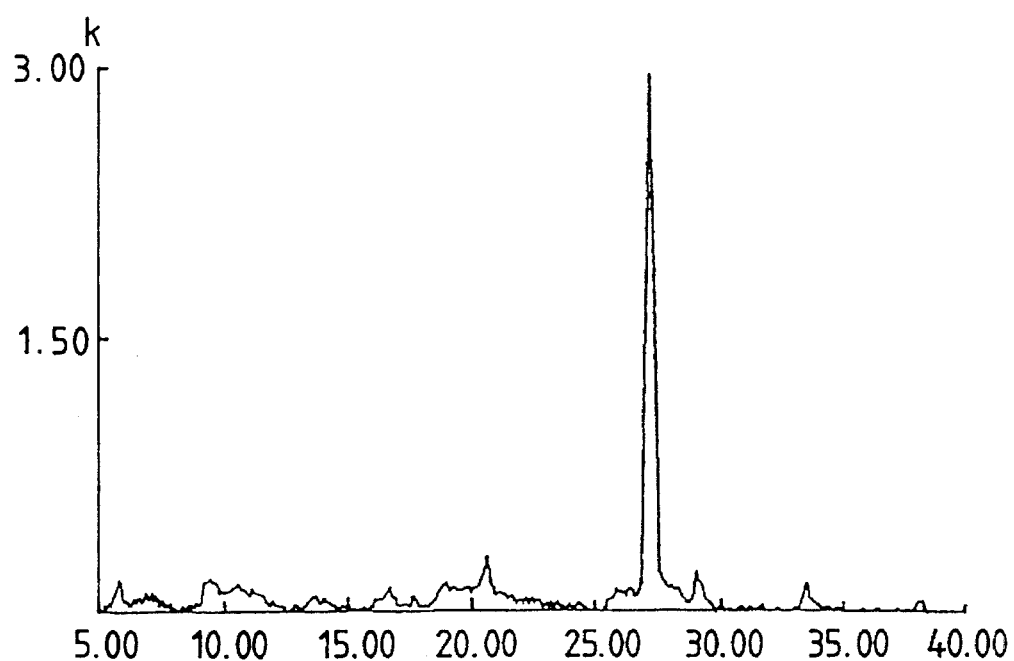
Figure 6:
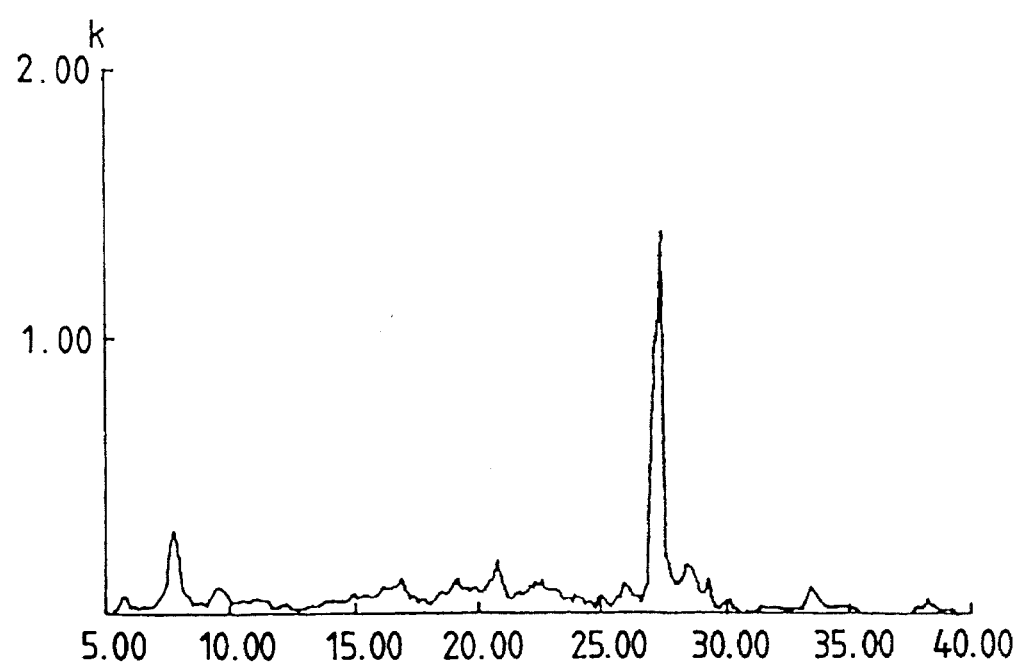
Figure 7:
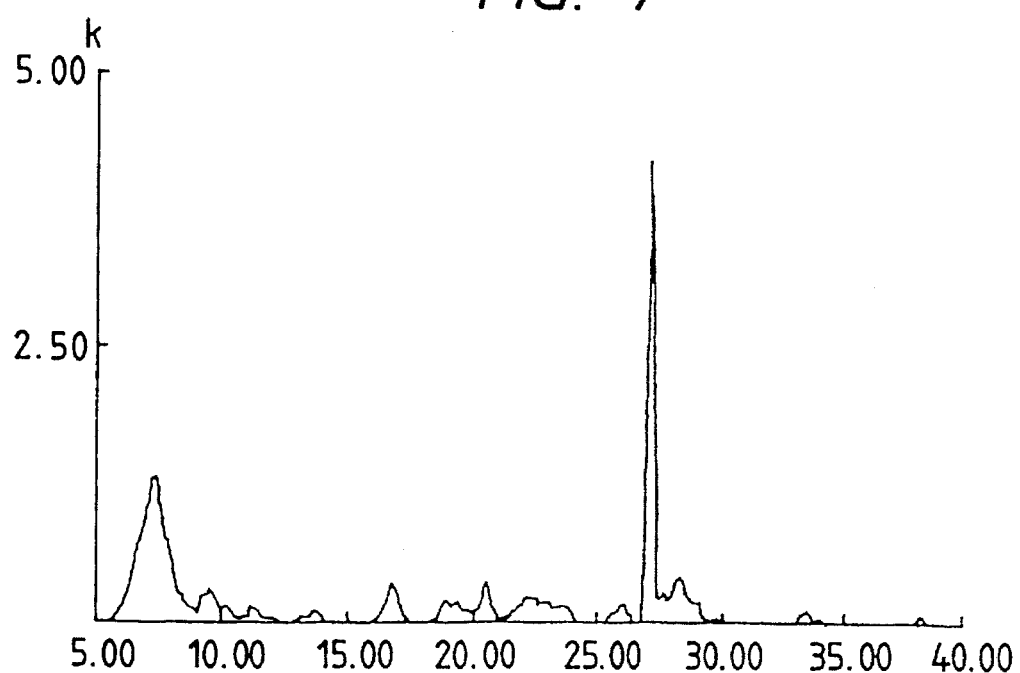
Figure 8:
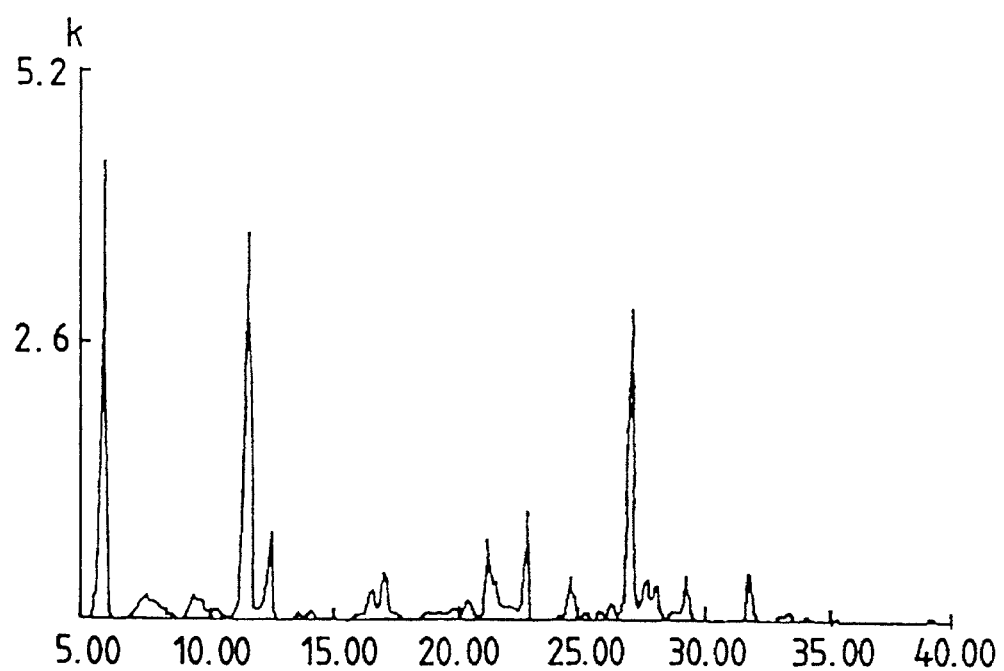

| Example No. | Solvent | Powder X-Ray Diffraction Pattern |
| --- | --- | --- |
| 1 | DMF | FIG. 2 |
| 2 | acetone | FIG. 3 |
| 3 | methanol | FIG. 4 |
| 4 | ethyl acetate | same as FIG. 1 |
| 5 | benzyl alcohol | same as FIG. 1 |
| 6 | tetrahydrofuran | FIG. 5 |
| 7 | toluene | same as FIG. 1 |
| 8 | quinoline | FIG. 6 |
| 9 | pyridine | FIG. 7 |
| 10 | triethylamine | FIG. 8 |

EXAMPLE 11

Figure 9:
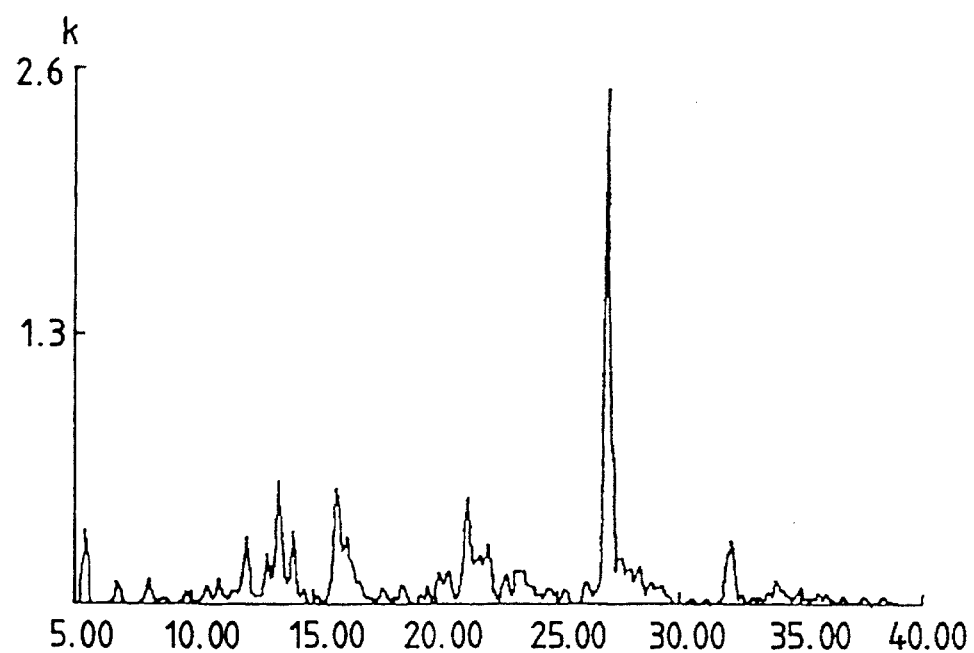

In 100 ml of o-dichlorobenzene were reacted 10 parts of gallium trichloride and 29.1 parts of phthalonitrile under a nitrogen stream at reflux for 4 hours. The reaction product was collected by filtration. An aliquot of the wet cake was dried and subjected to powder X-ray diffractiometry. The powder X-ray diffraction pattern obtained is shown in FIG. 9.

Figure 10:
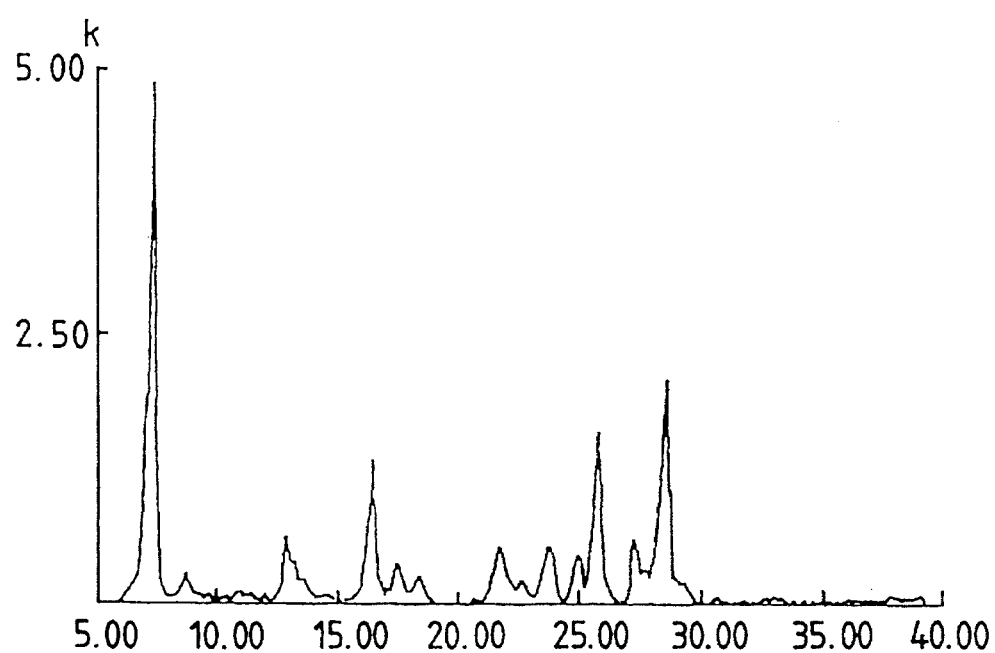

The rest of the wet cake was washed with 100 m of DMF, and an aliquot of the wet cake was dried and subjected to powder X-ray diffractiometry. The powder X-ray diffraction pattern obtained is shown in FIG. 10.

The rest of the wet cake was dispersed in 100 m of DMF and stirred at 150° C. for 30 minutes followed by filtration. The filter cake was thoroughly washed with methanol to obtain 12.2 parts (34.6%) of a chlorogallium phthalocyanine crystal. The powder X-ray diffraction pattern of the resulting chlorogallium phthalocyanine crystal was the same as FIG. 10.

EXAMPLE 12

The same reaction as in Example 11 was conducted except for using p-dichlorobenzene in place of o-dichlorobenzene. The reaction product was washed to obtain 5.1 parts (14.5%) of a chlorogallium phthalocyanine crystal. The powder X-ray diffraction pattern of the resulting chlorogallium phthalocyanine crystal was the same as FIG. 10.

EXAMPLE 13

Figure 11:
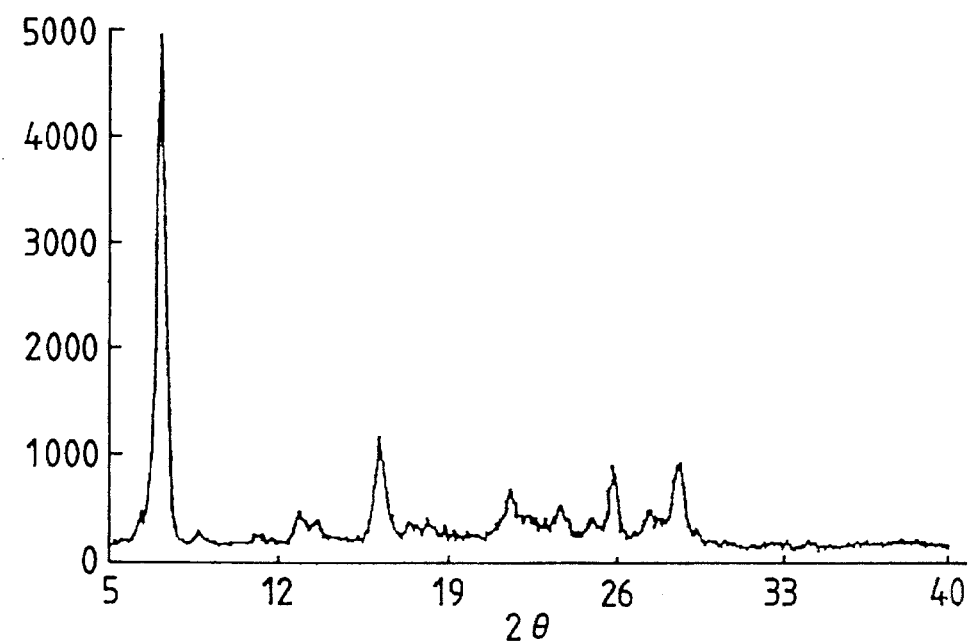

A mixture of 30 ml of o-dichlorobenzene, 10 parts of gallium trichloride, and 60 parts of phthalonitrile was heat-refluxed for 24 hours and cooled to 150° C. To the reaction mixture was added 100 ml of DMF followed by stirring under heating for 5 minutes. The produced chlorogallium phthalocyanine crystal was collected by filtration. The wet cake was dispersed in 100 ml of DMF, stirred at 150° C. for 30 minutes, and again filtered. The wet cake was thoroughly washed with methanol and dried to obtain 26.6 parts (75.3%) of a chlorogallium phthalocyanine crystal. The powder X-ray diffraction pattern of the resulting crystal is shown in FIG. 11.

COMPARATIVE EXAMPLE 1

Figure 12:
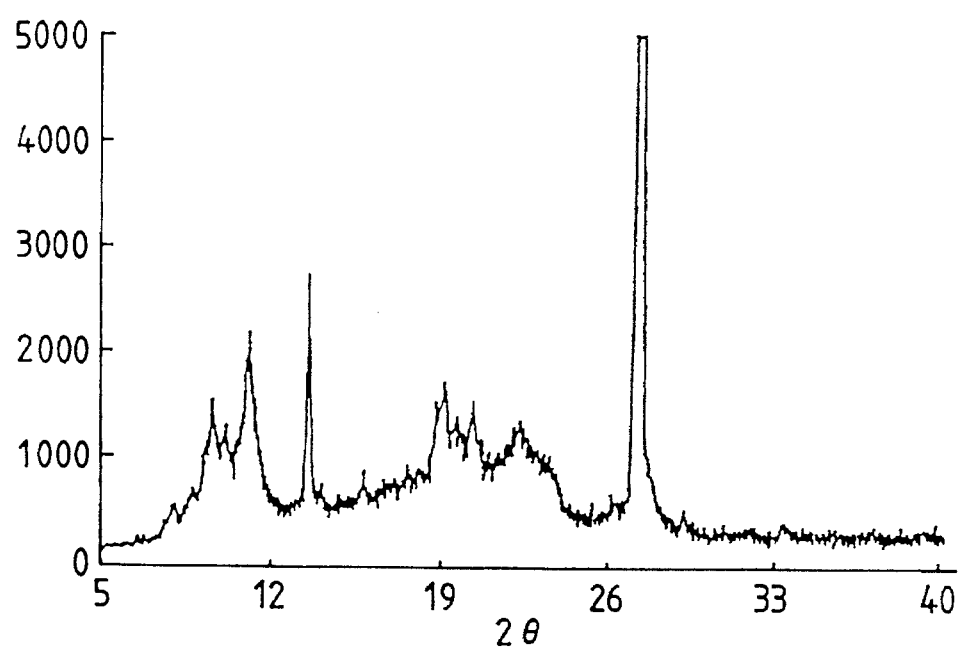
FIGS. 12 and 13 is each an X-ray diffraction pattern of the chlorogallium phthalocyanine crystals obtained in Comparative Examples 1 and 2, respectively.

In 230 parts of quinoline were reacted 30 parts of 1,3-diiminoisoindoline and 9.1 parts of gallium trichloride at 200° C. for 3 hours. The reaction product was collected by filtration was washed successively with acetone and methanol and dried to obtain 28 parts of a chlorogallium phthalocyanine crystal. The powder X-ray diffraction pattern of the resulting crystal is shown in FIG. 12.

COMPARATIVE EXAMPLE 2

Figure 13:
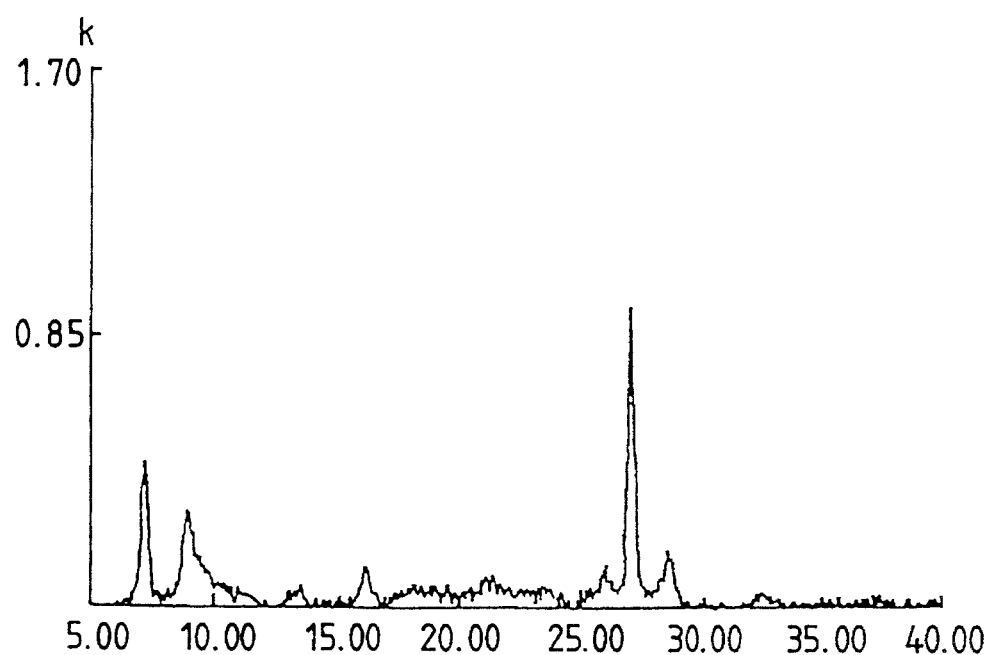

In a 300 ml flask were put 10 parts of gallium trichloride and 29.1 parts of phthalonitrile, and the mixture was allowed to react at 300° C. for 4 hours under a nitrogen stream. The resulting blue mass was thoroughly ground in a mortar, suspended in 200 ml of DMF, and heated at reflux for 1.5 hours in a nitrogen stream. The resulting chlorogallium phthalocyanine crystal was collected by filtration, and the filter cake was washed with DMF. After repeating washing with DMF two more times, the crystal was finally washed with 600 ml of methanol three times to obtain 25.1 parts of a chlorogallium phthalocyanine crystal. The elementary analysis values of the resulting chlorogallium phthalocyanine crystal were as follows. The powder X-ray diffraction pattern of the crystal is shown in FIG. 13. Further, the results of mass spectrum measurement revealed that the crystal was a mixture of compounds having no or 1 to 4 chlorine atoms on the phthalocyanine ring thereof.

Elementary Analysis for $C_{32}H_{16}N_8GaCl$: Calcd. (%): C: 62.22; H: 2.61; N: 18.14; C: 5.74 Found (%): C: 60.80; H: 2.43; N: 17.15; C: 6.95

CRYSTAL TRANSFORMATION EXAMPLE 1

Figure 14:
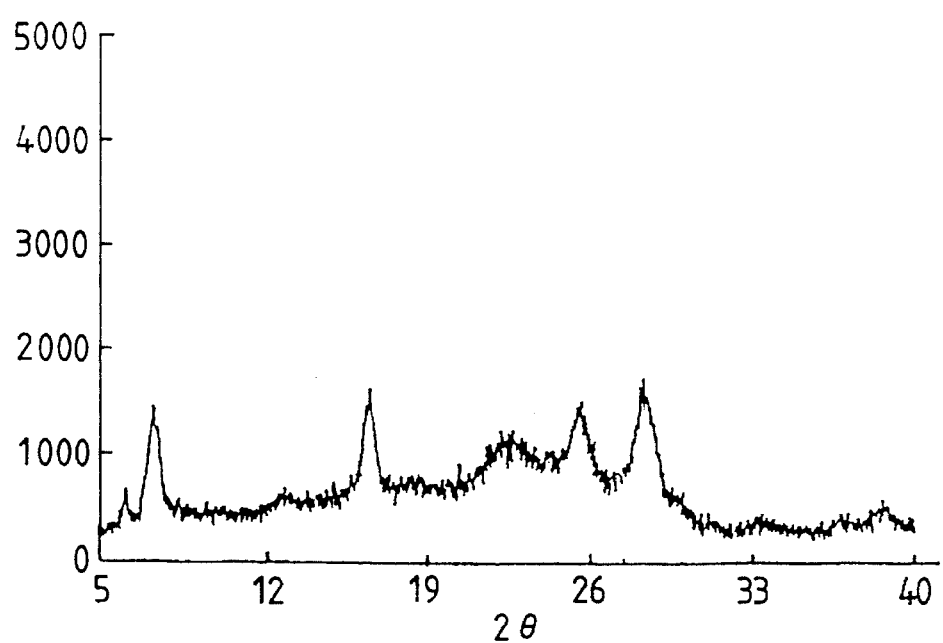
FIG. 14 is an X-ray diffraction pattern of the chlorogallium phthalocyanine crystal as obtained by dry grinding in Crystal Transformation Example 1.

Five parts of the chlorogallium phthalocyanine crystal obtained in Example 1 were dry ground in a planetary ball mill ("Model P-5" manufactured by Frich Co.) together with 200 parts of agate balls of 200 mm in diameter for 13 hours. The powder X-ray diffraction pattern of the grinds as obtained is shown in FIG. 14.

Figure 15:
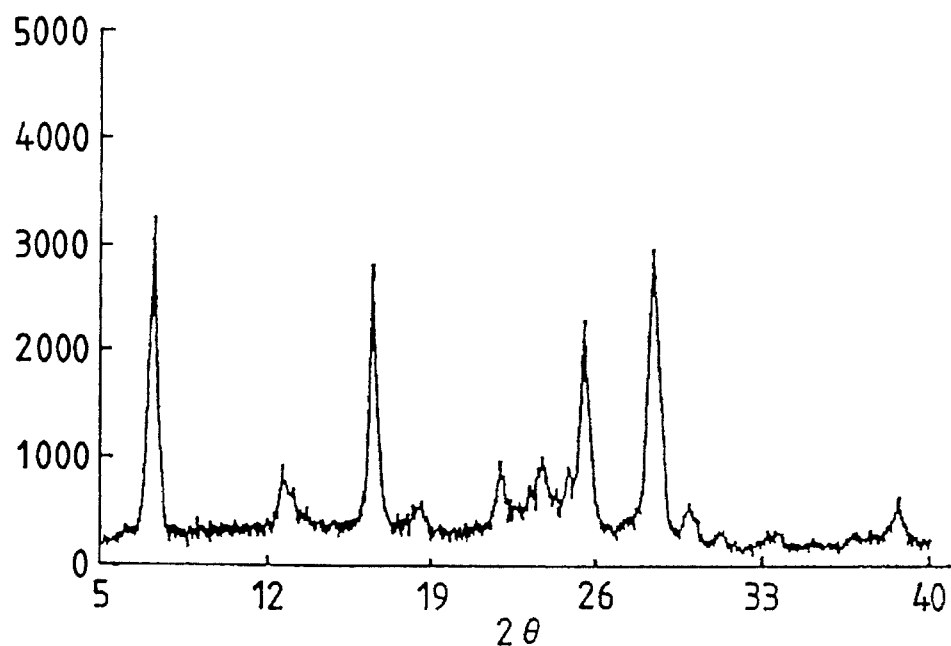
FIG. 15 is an X-ray diffraction pattern of the chlorogallium phthalocyanine crystal obtained in Crystal Transformation Example 1.

Then, 0.5 part of the grinds was milled in 20 parts of benzyl alcohol at room temperature for 24 hours together with 30 parts of glass beads of 1 mm in diameter. The glass beads were removed by filtration, and the chlorogallium phthalocyanine crystal was collected by centrifugation. The crystal was washed with methanol and dried. The powder X-ray diffraction pattern of the resulting crystal is shown in FIG. 15.

CRYSTAL TRANSFORMATION EXAMPLES 2 TO 6

Figure 16:
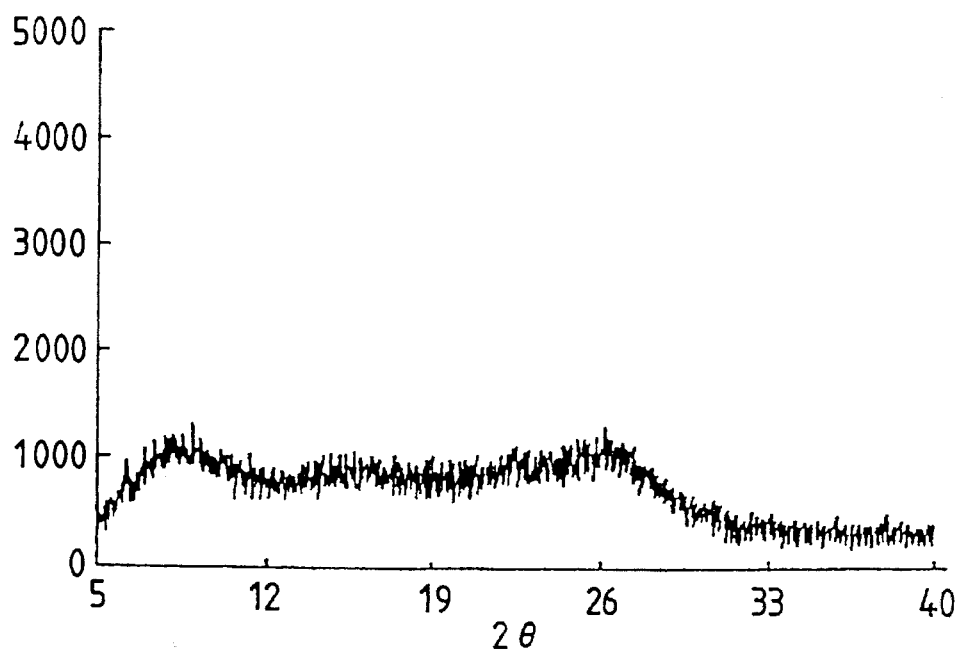
FIG. 16 is an X-ray diffraction pattern of the chlorogallium phthalocyanine crystal as obtained by dry grinding in Crystal Transformation Example 6.
Figure 17:
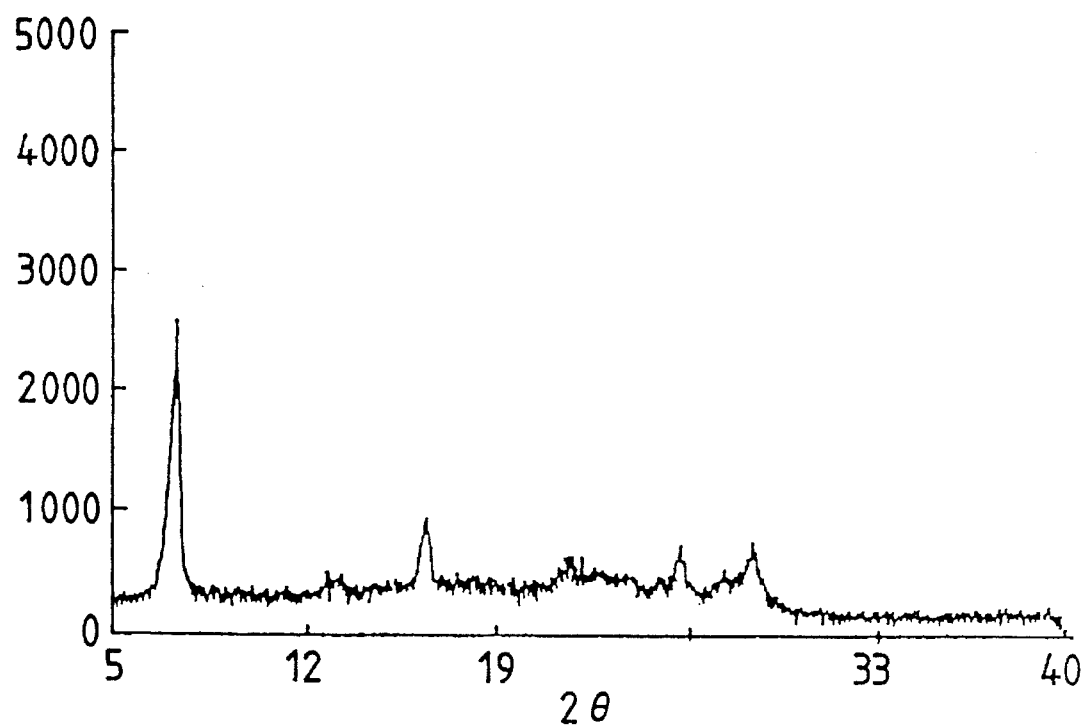
FIG. 17 is an X-ray diffraction pattern of the chlorogallium phthalocyanine crystal obtained in Crystal Transformation Example 6.

In the same manner as in Crystal Transformation Example 1, crystal transformation consisting of dry grinding and a solvent treatment was carried out on 5 parts of the chlorogallium phthalocyanine crystals obtained in Examples 11 to 13 and Comparative Examples 1 and 2. The powder X-ray diffraction pattern of the crystal as obtained after the solvent treatment was the same as FIG. 15 in all the cases except for the crystal of Comparative Example 2. In Table 2 below are shown the crystal form of the starting chlorogallium phthalocyanine crystal and the time required for that crystal to be dry ground so as to have the same crystal form as shown by FIG. 14. In the case of the crystal of Comparative Example 2, the powder X-ray diffraction pattern of the crystal as obtained after 20-hour dry grinding and that of the crystal as obtained after the solvent treatment are shown in FIGS. 16 and 17, respectively.

TABLE 2

| Crystal Transformation Example No. | Crystal Before Grinding | | Grinding Time (hr) |
|---|---|---|---|
| | Process of Synthesis | Crystal Form | |
| 1 | Example 1 | FIG. 2 | 13 |
| 2 | Example 11 | FIG. 10 | 3 |
| 3 | Example 12 | the same as FIG. 10 | 3 |
| 4 | Example 13 | FIG. 11 | 5 |
| 5 | Comparative Example 1 | FIG. 12 | 20 |
| 6 | Comparative Example 2 | FIG. 13 | — (FIG. 16) |

APPLICATION EXAMPLES 1 TO 6

A solution consisting of 10 parts of a zirconium compound ("Orgatics ZC540" produced by Matsumoto Seiyaku K.K.), 1 part of a silane compound ("A1110" produced by Nippon Unicar Co., Ltd.), 40 parts of isopropyl alcohol, and 20 parts of butanol was coated on an aluminum substrate by dip coating and dried by heating at 150° C. for 10 minutes to form a subbing layer having a thickness of 0.5 μm.

The chlorogallium phthalocyanine crystal obtained in Crystal Transformation Example 1 (0.1 part) was mixed with 0.1 part of a polyvinyl butyral resin ("S-Lec BM-S" produced by Sekisui Chemical Co., Ltd.) and 10 parts of n-butyl acetate, and the mixture was dispersed in a paint shaker together with glass beads for 1 hour. The resulting coating composition was coated on the subbing layer with a wire bar No. 5 and dried by heating at 100° C. for 10 minutes to form a charge generating layer having a thickness of about 0.15 μm. X-Ray diffractoimetry of the hydroxygallium phthalocyanine crystal in the coating composition revealed that the crystal form had not changed on being dispersed.

In 20 parts of monochlorobenzene were dissolved 2 parts of a compound represented by formula (I):

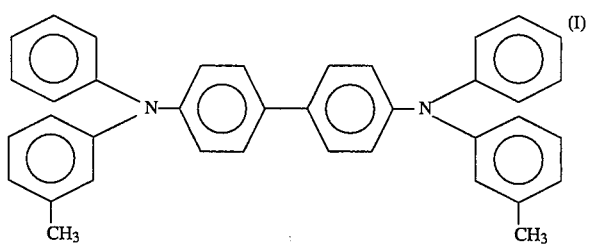

and 3 parts of a polycarbonate resin represented by formula (II):

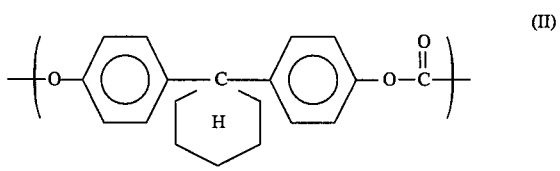

and the resulting coating composition was coated on the charge generating layer by dip coating and dried by heating at 120° C. for 1 hour to form a charge transporting layer having a thickness of 20 μm.

Electrophotographic characteristics of the thus prepared electrophotographic photoreceptor were evaluated by using a flat plate scanner manufactured by the applicant of the present invention as follows. The photoreceptor was charged to a potential of $V_0$ V by a corona discharge of $-2.5$ μA under a normal temperature and normal humidity condition (20° C., 40% RH). After 1 second, the dark potential $V_{DDP}$ (V) was measured to obtain a dark decay rate DDR (DDR=$V_0$–$V_{DDP}/V_0 \times 100(\%)$). Then, the photoreceptor was exposed to monochromatic light of 780 nm which was isolated from light emitted from a tungsten lamp by means of a monochromator and adjusted to 0.25 μmW/cm² on the surface of the photoreceptor. The initial sensitivity (dV/dE (V.cm²/erg)) was measured. The results of these measurements are shown in Table 3 below.

An electrophotographic photoreceptor was prepared in the same manner as described above, except for using the chlorogallium phthalocyanine crystals obtained in Crystal Transformation Examples 2 to 6, and the electrophotographic characteristics of the photoreceptor were evaluated in the same manner. The results obtained are also shown in Table 3.

TABLE 3

| Application Example No. | Crystal Transformation Example No. of Chlorogallium Phthalocyanine Used | $V_0$ (V) | $V_{DDP}$ (V) | DDR (%) | dV/dE (V.cm²/erg) |
|---|---|---|---|---|---|
| 1 | 1 | −635 | −605 | 4.7 | 129 |
| 2 | 2 | −632 | −599 | 5.2 | 125 |
| 3 | 3 | −644 | −608 | 5.6 | 131 |
| 4 | 4 | −627 | −596 | 4.9 | 128 |
| 5 | 5 | −625 | −588 | 5.9 | 121 |
| 6 | 6 | −347 | −270 | 22.3 | 2 |

The chlorogallium phthalocyanine crystals according to the present invention can easily be transformed into a crystal form excellent in electrophotographic characteristics. The chlorogallium phthalocyanine crystal resulting from the crystal transformation provides an electrophotographic photoreceptor exhibiting a small dark decay rate and high photosensitivity.

While the invention has been described in detail and with reference to specific examples thereof, it will be apparent to one skilled in the art that various changes and modifications can be made therein without departing from the spirit and scope thereof.

What is claimed is:

1. A process for preparing chlorogallium phthalocyanine comprising the steps of:
   reacting gallium trichloride and phthalonitrile or diiminoisoindoline in a halogenated aromatic hydrocarbon solvent having a boiling point of not lower than 150° C.; and treating the resulting chlorogallium phthalocyanine with a second solvent different from said halogenated aromatic hydrocarbon solvent.

2. A process as claimed in claim 1, wherein said chlorogallium phthalocyanine is a chlorogallium phthalocyanine crystal.

3. A process as claimed in claim 1, wherein said second solvent is selected from the group consisting of aromatic hydrocarbon solvents, amide solvents, aliphatic alcohol solvents, aliphatic polyhydric alcohol solvents, ketone solvents, aliphatic halogenated hydrocarbon solvents, ether solvents, water, and mixtures of two or more thereof.

4. A process as claimed in claim 2, wherein said chlorogallium phthalocyanine crystal is a crystal showing a distinct diffraction peak at a Bragg angle ($2\theta \pm 0.2°$) of 7.4° in an X-ray diffraction spectrum.

5. A process for preparing a chlorogallium phthalocyanine crystal showing distinct diffraction peaks at Bragg angles ($2\theta \pm 0.2°$) of 7.4°, 16.6°, 25.5°, and 28.3° in an X-ray diffraction spectrum, said process comprising the steps of:

reacting gallium trichloride and phthalonitrile or diiminoisoindoline in a halogenated aromatic hydrocarbon solvent having a boiling point of not lower than 150° C.;

treating the resulting chlorogallium phthalocyanine with a second solvent different from said halogenated aromatic hydrocarbon solvent, to obtain a chlorogallium phthalocyanine crystal showing a distinct diffraction peak at a Bragg angle ($2\theta \pm 0.2°$) of 7.4° in an X-ray diffraction spectrum;

dry grinding said chlorogallium phthalocyanine crystal showing a distinct diffraction peak at a Bragg angle ($2\theta \pm 0.2°$) of 7.4°; and treating the ground crystal with an aromatic alcohol to convert the crystal form thereof.

6. A process for preparing chlorogallium phthalocyanine comprising the step of reacting gallium trichloride and phthalonitrile or diiminoisoinodoline in a halogenated aromatic hydrocarbon solvent having a boiling point of not lower than 150° C.

7. A process as claimed in claim 6, wherein said chlorogallium phthalocyanine is a chlorogallium phthalocyanine crystal showing distinct diffraction peaks at Bragg angles ($2\theta \pm 0.2°$) of 5.6, 11.2, 22.7, 27.0, 29.2, and 31.6 in an X-ray diffraction spectrum.

8. The process according to claim 1, wherein said halogenated hydrocarbon solvent is used in an amount from 0.2 to 20 times by weight of said phthalonitrile or diiminoisoindoline.

9. The process according to claim 8, wherein said halogenated hydrocarbon solvent is used in an amount from 0.3 to 10 times by weight of said phthalonitrile or diiminoisoindoline.

10. The process according to claim 1, wherein the reaction of gallium trichloride and phthalonitrile or diiminoisoindoline is carried out by heating at a temperature ranging from 100° C. up to the boiling point of the second solvent in an inert atmosphere.

11. The process according to claim 1, wherein said treatment with a second solvent is carried out at a temperature from 100° C. to the boiling point of the solvent.

12. The process according to claim 5, wherein said halogenated hydrocarbon solvent is used in an amount from 0.2 to 20 times by weight of said phthalonitrile or diiminoisoindoline.

13. The process according to claim 12, wherein said halogenated hydrocarbon solvent is used in an amount from 0.3 to 10 times by weight of said phthalonitrile or diiminoisoindoline.

14. The process according to claim 5, wherein the reaction of gallium trichloride and phthalonitrile or diiminoisoindoline is carried out by heating at a temperature ranging from 100° C. up to the boiling point of the solvent in an inert atmosphere.

15. The process according to claim 5, wherein said treatment with a second solvent is carried out at a temperature from 100° C. to the boiling point of the second solvent.

16. The process according to claim 6, wherein said halogenated hydrocarbon solvent is used in an amount from 0.2 to 20 times by weight of said phthalonitrile or diiminoisoindoline.

17. The process according to claim 16, wherein said halogenated hydrocarbon solvent is used in an amount from 0.3 to 10 times by weight of said phthalonitrile or diiminoisoindoline.

18. The process according to claim 6, wherein the reaction of gallium trichloride and phthalonitrile or diiminoisoindoline is carried out by heating at a temperature ranging from 100° C. up to the boiling point of the solvent in an inert atmosphere.

* * * * *